United States Patent
Haardt et al.

(10) Patent No.: US 6,353,731 B1
(45) Date of Patent: Mar. 5, 2002

(54) METHOD AND MEASUREMENT CONFIGURATION FOR MEASURING THE CHARACTERISTICS OF RADIO CHANNELS

(75) Inventors: Martin Haardt; Christopher Brunner, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/587,556

(22) Filed: Jun. 5, 2000

Related U.S. Application Data

(63) Continuation of application No. PCT/DE98/03145, filed on Oct. 27, 1998.

(30) Foreign Application Priority Data

Dec. 5, 1997 (DE) .......................................... 197 54 031

(51) Int. Cl.[7] .............................................. H04B 17/00
(52) U.S. Cl. ...................... 455/67.1; 455/456; 455/562; 370/347; 370/349
(58) Field of Search ........................... 455/67.1, 17, 18, 455/67.3, 67.4, 67.5, 67.6, 456, 500, 66, 561, 562; 375/347, 349, 148

(56) References Cited

U.S. PATENT DOCUMENTS

| | | | | |
|---|---|---|---|---|
| 5,444,451 | A | * 8/1995 | Johnson et al. | 342/453 |
| 6,070,079 | A | * 5/2000 | Kuwahara | 455/456 |
| 6,084,928 | A | * 7/2000 | Kuwahara | 375/347 |
| 6,177,906 | B1 | * 1/2001 | Petrus | 342/378 |
| 6,188,325 | B1 | * 2/2001 | Choi et al. | 342/378 |
| 6,215,983 | B1 | * 4/2001 | Dogan et al. | 455/63 |
| 6,240,098 | B1 | * 5/2001 | Thibault et al. | 370/431 |

FOREIGN PATENT DOCUMENTS

| | | |
|---|---|---|
| DE | 195 11 752 A1 | 10/1996 |
| DE | 195 11 751 A1 | 12/1996 |

OTHER PUBLICATIONS

Utz Martin: "Modeling the Mobile Radio Channel by Echo Estimation", Frequenz, 48 (1994), vol. 9, pp. 198–212.

Simon Haykin: "Communication Systems", John Wiley and Sons, Inc., 3rd edition 1994, pp. 431–434.

Martin Haardt: "Efficient High–Resolution 3–D Channel Sounding", pp. 164–168, XP–002097969.

Martin Haardt: "3–D Unitary ESPRIT for joint 2–D Angle and Carrier Estimation", pp. 255–258, XP–002097970.

(List continued on next page.)

*Primary Examiner*—William Trost
*Assistant Examiner*—Congvan Tran
(74) *Attorney, Agent, or Firm*—Herbert L. Lerner; Laurence A. Greenberg; Werner H. Stemer

(57) ABSTRACT

A method for measuring characteristics of radio channels, in which the signals are received by a total of $M_1$ receiving sensors in a linear antenna array, in which case the respective received signals are composed of wave elements of a transmitted signal with a different incidence direction and different delay, the transmitted signal contains a preselected test sequence, and the incidence angle as well as the delay of the dominant wave fronts are estimated simultaneously, taking account of the chip signal form of the test sequence, the signals from each antenna sensor are demodulated, and sampling is then carried out with $M_c$ samples per chip in the test sequence. In this case, the resultant $N_c \times M_c$ samples are transformed to the frequency domain by discrete Fourier transformation, and the values which are obtained from this are corrected taking account the spectrum of the chip signal form, in which case the line vectors formed from the values obtained for each sensor can be combined to form a data matrix $X_F(n)$, which contains invariances which characterize the channel.

19 Claims, 1 Drawing Sheet

OTHER PUBLICATIONS

Josef Fuhl et al.: "High–Resolution 3–Direction–of–Arrival Determination for Urban Mobile radio", pp. 672–682, XP–000686403.

Martin Haardt et al.: "2D Unitary ESPRIT for Efficient 2D Parameter Estimation", pp. 2096–2099, XP–002009163.

Richard Roy et al.: "ESPRIT–Estimation of Signal Parameters Via Rotational Invariance Techniques", pp. 984–995, XP–000037318.

Utz Martin: "Echo Estimation—Deriving Simulation Models for the Mobile radio Channel", Proc. IEEE Vehicular Techn. Co., 1994, pp. 231–235.

Utz Martin: "Charakterisierung und Simulation des richtungsabhängigen Funkkanals", ITG Workshop on Smart Antennas, Zürich, 1996, characterization and simulation of directional radiofrequency channel.

B.H. Fleury et al.: "Wideband Angle of Arrival Estimation Using the SAGE Algorithm", Proc. IEEE ISSSTA, Mainz, 1996, pp. 79–85.

* cited by examiner

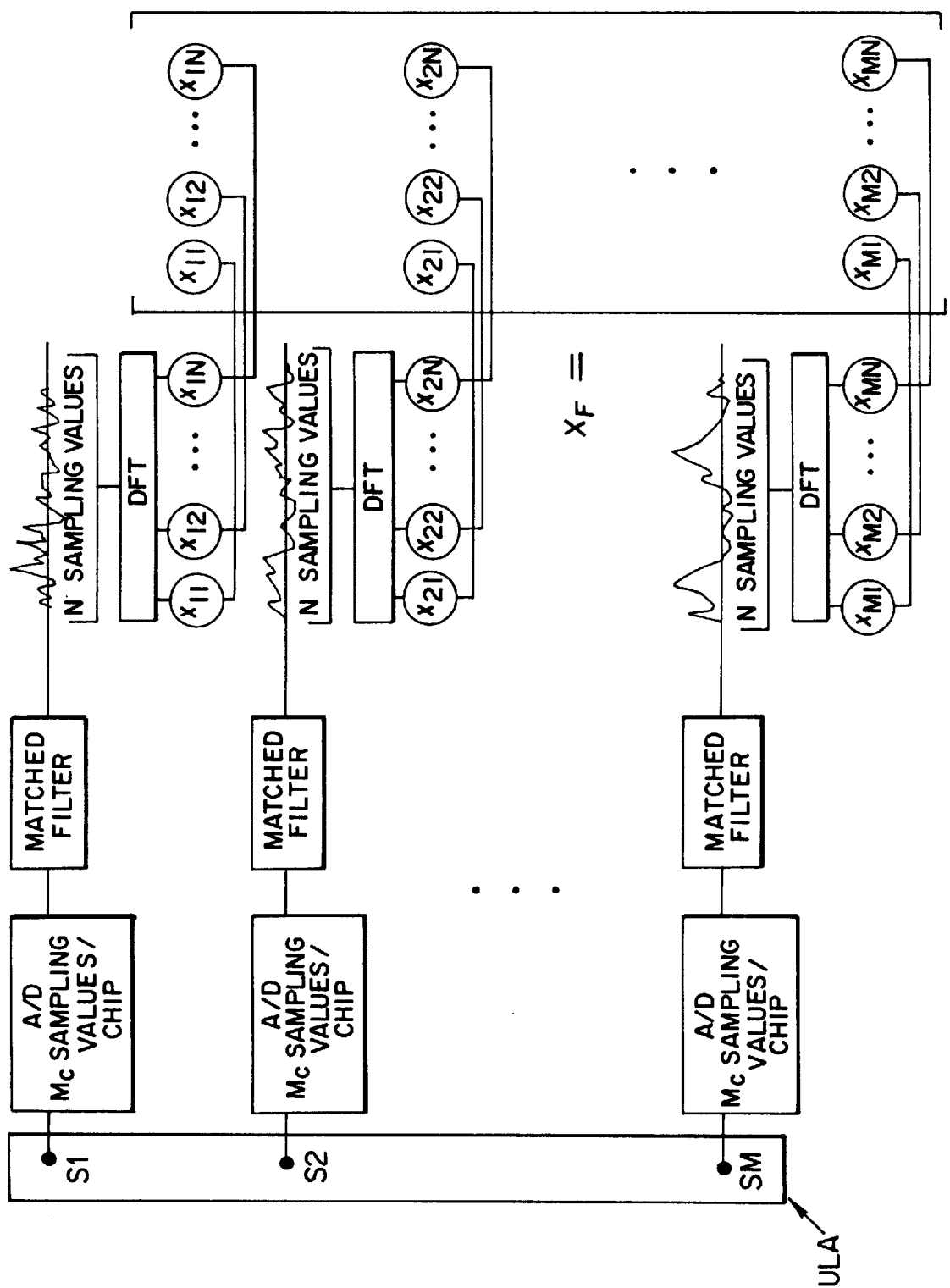

METHOD AND MEASUREMENT CONFIGURATION FOR MEASURING THE CHARACTERISTICS OF RADIO CHANNELS

CROSS-REFERENCE TO RELATED APPLICATION

This is a continuation of copending international application PCT/DE98/03145, filed Oct. 27, 1998, which designated the United States.

BACKGROUND OF THE INVENTION

Field of the Invention

The invention lies in the telecommunications field. More specifically, the invention relates to a method for measuring the characteristics of radio channels, in which the signals are received by a total of $M_1$ receiving sensors in a linear antenna array, wherein the respective received signals are composed of wave elements of a transmitted signal with a different incidence direction and different delay. The invention furthermore relates to a measurement configuration for measuring the characteristics of radio channels having a linear antenna array, having a number of antenna sensors. Each antenna sensor is followed (in a signal flow direction) by analog/digital sampling, a filter matched to the signal, a stage for discrete Fourier transformation, and at least one signal processor is provided for the reception stages.

In a large number of applications, such as sonar, radar, satellite communication and mobile radio, high-resolution radio channel measurements, which also supply directional information, are desirable. A mobile radio channel represents the connection between a base station and mobile stations, and deep knowledge of the channel characteristics is required in order to allow propagation and channel models to be developed and used. Such models are required by system providers to plan their networks, and the propagation environment is an essential basis for designing mobile radio systems.

Increasing numbers of subscribers and a limited number of available frequencies necessitate improved spectral efficiency. A significant improvement is obtained by using intelligent antenna arrays, such as those described in German patent application DE 195 11 751 A, for example. There, use is made of the spatial diversity inherent in the radio channel. The design and provision of radio systems with intelligent antennas necessitate high-resolution measurements of the direction information on radio channels.

Two methods, in particular, for channel investigation have become known in order to solve the problem, and these methods estimate both the delay and the azimuth of the dominant wave fronts, that is to say the most powerful wave fronts for example, which arrive at an antenna configuration. Both methods furthermore use a test signal which consists of a pulse sequence modulated by means of a pseudo-random sequence.

The following two articles are of interest: U. Martin, "Modeling the mobile radio channel by echo estimation," Frequenz, vol. 48, pp. 198–212, 1994; and U. Martin, "Echo estimation—Deriving simulation models for the mobile radio channel," in Proc. IEEE Vehicular Techn. Conf., vol. 1, pp. 231–35, Chicago Ill., July 1995. They describe how the parameters of certain statistical channel models can be obtained from the results of propagation measurements. The author describes a measurement configuration in which estimates of the path delay times are made with high resolution in the frequency domain by estimation of superimposed exponential oscillations.

Alternatively, it is possible to use a method which has generally become known by the name ESPRIT, such as the 1D unitary ESPRIT method, which is disclosed in German patent application DE 195 11 752 A. If the receiving antenna of that channel measurement configuration is replaced by a centrally symmetrical antenna array, a two-dimensional (2D) unitary ESPRIT method can automatically provide estimates of both the incidence angle and the delay time for dominant signal paths. Such high-resolution direction measurements of radio channels make it easier to develop realistic channel models which include the dominant incidence directions at the base station. The 2D unitary ESPRIT method, in conjunction with this channel measurement configuration and uniform linear antenna array, has been proven in a number of field measurements, and it automatically supplies pairs of estimates of the incidence angle and of the delay time for the dominant paths, as described in U. Martin, "Charakterisierung und Simulation des richtungsabhängigen Funkkanals" [Characterization And Simulation Of The Directional Radio Channel], ITG Workshop on Smart Antennas, Zurich, October 1996.

The second method for channel investigation, described Fleury, Dahlhaus, Heddergott, and Tschudin, in "Wideband Angle Of Arrival Estimation Using The SAGE Algorithm" in Proc. IEEE ISSSTA, vol. 1, pp. 79–85, Mainz, September 1996, is based on the SAGE (space-alternating generalized expectation maximization) algorithm. This iterative method provides an estimate of the parameters based on the highest probability. This method involves considerably more computation complexity than the 2D unitary ESPRIT method mentioned above, since it is based on various 1D optimization processes and requires an additional algorithm, for example that from the 2D unitary ESPRIT method to solve its initial value problem. The channel investigation method based on the 2D unitary ESPRIT algorithm (and which is also required in order to understand the invention) will therefore be explained in more detail in the following text further below.

In addition, a method which also allows the incidence direction of received wave fronts to be estimated is known from Roy and Kailath, "ESPRIT—Estimation of Signal Parameters Via Rotational Invariance Techniques" in IEEE Transactions on Acoustics, Speech and Signal Processing, vol. 37, No. 7, July 1989, pages 984–995.

Finally, Josef Fuhl, et al., "High-Resolution 3-D Direction-of-Arrival Determination for Urban Mobile Radio," IEEE Transactions on Antennas and Propagation, vol. 45, No. 4, April 1997, pages 672–682 describes a method for estimating the direction of electromagnetic waves arriving at a receiver, with the azimuth and elevation angles being determined at the same time once the propagation time delays of the electromagnetic waves have previously been determined.

SUMMARY OF THE INVENTION

The object of the invention is to provide a method and a device for measuring the characteristics of radio channels which overcome the above-noted deficiencies and disadvantages of the prior art devices and methods of this kind, and which method supplies pairs of values for the azimuth propagation time delay of the incident wave fronts with higher accuracy and less computation complexity—and thus more quickly as well.

With the above and other objects in view there is provided, in accordance with the invention, a method of measuring characteristics of radio channels, which comprises:

transmitting a transmission signal containing a preselected test sequence;

receiving signals with a plurality of receiving sensors in a linear antenna array, wherein respective received signals are composed of wave elements of the transmission signal with a different incidence direction and different delay;

demodulating the received signals and sampling to obtain samples;

supplying the samples for calculation of eigen vectors corresponding to dominant eigenvalues, and deriving a signal subspace matrix from the calculated eigen vectors;

producing invariance equations dependent on the signal subspace matrix; and simultaneously determining estimated values for an incidence direction and delays of dominant wave fronts by solving the invariance equations.

Compared with the prior art methods, the invention allows the accuracy to be considerably increased and the computation complexity to be reduced. The invention can be used particularly expediently in the mobile radio field, but is not limited to this. Its advantages are also applicable, for example, to sonar applications and in radar technology.

When the azimuth and delay are being estimated, a data matrix contains a spatial invariance and a time invariance superimposed for each wave front.

The spatial frequency can be converted very easily to the incidence direction of the wave fronts at the measurement station (azimuth), and the associated time frequency can be converted very easily into the associated delay at the measurement configuration.

The invention determines the spatial and time invariances superimposed in the data matrix for each dominant wave front and converts them into corresponding angles and delays for each dominant wave front. Furthermore, the complex amplitudes can be estimated on the basis of the estimated three-dimensional parameters.

Improved results can be widely obtained if the test sequence has a chip signal form and simultaneous estimation is carried out taking account of the chip signal form of the test sequence.

Advantageous signal processing is obtained if the signals of each antenna sensor are demodulated, and sampling is then carried out with a total of $M_c$ samples per chip in the test sequence.

In order to achieve simple signal processing, it is also expedient if the resultant samples are transformed to the frequency domain by discrete Fourier transformation, and/or the resultant values are corrected taking account of the spectrum of the chip signal form, in which case the line vectors formed from the values obtained for each sensor can be combined to form a data matrix $X_F(n)$, which contains invariances which characterize the channel.

In accordance with an expedient variant of the invention, a modulated pseudo-random noise sequence is used as the transmitted signal. The use of such a pseudo-random noise sequence results in the advantage that, on the one hand, it is easy to produce and, on the other hand, is easy to evaluate.

The azimuth incidence direction is preferably measured since this has the greatest importance, particularly for mobile radio.

Simple signal processing is also achieved if the signals received by the receiving sensors are mixed to baseband before being demodulated.

In accordance with an additional feature of the invention, the sample signals are filtered, matched to the signal, since this results in the signal-to-noise ratio being optimized.

In addition, it is expedient if the received signals are oversampled, that is to say they are sampled at a sampling frequency which is greater than twice the received signal bandwidth, since this also allows an improvement in the signal-to-noise ratio to be achieved.

In order to limit the processing complexity to a reasonable level, it is worthwhile, once the samples have been transformed to the frequency domain, rejecting values below a power limit which can be predetermined.

In order to improve the time invariance structure, it is also advantageous, once they have been transformed to the frequency domain, for the samples to be corrected by division by the square of the spectrum of the chip signal form.

It may also be expedient to subject samples to smoothing in the space/frequency domain. This results in a further reduction in the computation complexity, and decorrelation of the wave fronts.

One worthwhile variant is distinguished by the use of a two-dimensional, high-resolution frequency estimation algorithm in the space/frequency domain to determine and associate the superimposed spatial and time invariances. Improved estimation accuracy is obtained by joint estimation of the azimuth and delay time of the dominant wave fronts.

In order to ensure that the estimation results are realistic, it is advisable for the two-dimensional, high-resolution frequency estimation algorithm to take account of the colored noise in the space/frequency domain.

Furthermore, the 2D unitary ESPRIT method can be used as the frequency estimation algorithm, since this method automatically gives paired 2D parameter estimated values and high estimation accuracy with little computation complexity.

It is also expedient if the complex amplitudes are estimated jointly in the space/frequency domain and/or in the space/time domain. Joint estimation in the space/frequency domain has the advantage that the estimate is made in the same domain as the other parameter estimate, while, in contrast, joint estimation in the space/time domain involves less computation complexity and gives more accurate estimation results.

In this case, it is worthwhile if the joint estimation is carried out using the weighted least squares method, since this corresponds to the realistic estimate with minimum variance. In this context, reference is had to D. G. Luenberger, Optimization by Vector Space Models, John Wiley and Sons, New York, N.Y., 1969 (pages 82–83).

With the above and other objects in view there is also provided a measurement configuration for measuring characteristics of radio channels, comprising: a linear antenna array;

a plurality $M_1$ of receiving sensors;

each of said receiving sensors being followed, in a signal flow direction:

an analog/digital sampling device connected to a respective said sensor;

a matched filter connected to said sampling device; and a device for discrete Fourier transformation connected to said filter;

and at least one signal processor for processing the method according to the above-outline method.

Other features which are considered as characteristic for the invention are set forth in the appended claims.

Although the invention is illustrated and described herein as embodied in a method and measurement configuration for measuring the characteristics of radio channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a schematic illustration of the process involved in the method according to the invention, starting from the individual sensors in a linear antenna array, to the data matrix which represents the channel model.

DESCRIPTION OF THE PREFERRED EMBODIMENTS

Referring now to the FIGURE of the drawing in detail it is, first of all, assumed that the channel remains unchanged over P pulse sequences. The test signal comprises P pulse sequences, which are modulated by means of a PN (pseudorandom noise) sequence (see S. Haykin, Communication Systems, John Wiley & Sons, New York, N.Y., 3rd Edition, 1994, pages 431–434, and can be written as follows:

$$s(t) = \sum_{i=0}^{P-1} c(t - iT) \quad \text{where} \quad c(t) = \sum_{m=0}^{N_c-1} d_m p_c(t - mT_c). \tag{1}$$

Furthermore, $N_c$ is the number of chips in a PN sequence, given by $d_m$, $0 \leq m \leq N_c - 1$. In equation (1), $T_c$ denotes the chip duration, T the sequence duration, and $p_c(t)$ describes the chip signal form. For example, the so-called "raised cosine" signal form can be used, which is defined as follows:

$$p_c(t) = \sqrt{\frac{E_c}{T_c}} \cdot \text{sinc}(2W_n t) \cdot \frac{\cos(2\pi \beta W_n t)}{1 - (4\beta W_n t)^2} \tag{2}$$

where $$W_n = \frac{1}{2 \cdot T_{c'}}$$

with β denoting the roll-off factor and $W = W_n(1+\beta)$ denoting the required signal bandwidth (see S. Haykin, Communication Systems, John Wiley & Sons, New York N.Y., 3rd edition, 1994). $W_n$ denotes the signal bandwidth of a Nyquist channel (β=0). In order to satisfy the Nyquist condition, the sampling interval must be less than or equal to $T_c/(1+\beta)$.

It is assumed that a transmitting mobile unit is located in the far field of the antenna array, so that the incident wave fronts are essentially planar. The narrowband assumption is valid: provided the complex envelopes of the incident wave fronts change only insignificantly during the propagation time along the antenna array. The signal model thus includes the delay time, the amplitude and the incidence direction (azimuth) of each wave front which arrives at the antenna array of the measurement station or base station. Without any loss of generality, a uniform linear antenna array ULA having M identical sensors is used at the measurement station. K narrowband planar wave fronts with the wavelength λ, the azimuth $\phi_k$ and the amplitude $\rho_k$, where $1 \leq k \leq K$, arrive at the arrangement or array of M sensors. The measurements, which are subject to noise, can be represented as:

$$x(t) = AD_s s(t) + n(t), \tag{3}$$

where the complex M×K control matrix of the arrangement $$A = [a_1 \, a_2 \, \ldots \, a_k \, \ldots \, a_K] \in C^{M \times K}$$

is composed of K columns of control vectors $a_k$. Each control vector depends on the azimuth $\phi_k$ of the $k^{th}$ wave front:

$$a_k = \begin{bmatrix} 1 & e^{j2\pi\frac{\Delta}{\lambda}\sin(\phi_k)} & \ldots & e^{j2\pi m\frac{\Delta}{\lambda}\sin(\phi_k)} & \ldots & e^{j2\pi(M-1)\frac{\Delta}{\lambda}\sin(\phi_k)} \end{bmatrix}^T \tag{4}$$

The scalar Δ denotes the distance between the sensors, and the superscript figure $^T$ indicates the transposition. Owing to multipath propagation, s(t)K contains versions of the test signal with different delays:

$$s(t) = [s(t-\tau_1) \, s(t-\tau_2) \, \ldots \, s(t-\tau_k) \, \ldots \, s(t-\tau_K)]^T. \tag{5}$$

In this case, $\tau_k$ denotes the unknown propagation delay of the $k^{th}$ wave front. The K×K diagonal matrix $D_s$ is given by $$D_s = \text{diag}\{\rho_1, \rho_2, \ldots, \rho_K\}, \tag{6}$$

where $\rho_k$ denotes the discrepancy for the propagation path k, and $n(t) \in C^M$ denotes additive noise. The spatial covariance matrix of the noise is defined as $$R_{nn,M} = E\{nn^H\} \in C^{M \times M}. \tag{7}$$

The signal received at each antenna is sampled at a rate $$f_s = \frac{M_c}{T_c},$$

with the number of samples per chip or the oversampling factor $M_c$ being assumed to be an integer. X denotes a complex M×N data matrix which comprises $N = N_c M_c$ samples $x(nT_c/M_c)$, $1 \leq n \leq N$. These measurements are sampled simultaneously for all M sensors.

The sampled output signal from each antenna is passed through a filter with the impulse response $h[n] = c[-n]$, where $c[n] = c(nT_c/M_c)$. $X_{MF}$ denotes that M×N matrix whose j-th row contains N samples of the output of the j-th antenna downstream from the matched filter for the n-th period. The convolution takes place in the time domain, and this corresponds to multiplication of the N-point discrete Fourier transforms by h[n] in the frequency domain. In this context, see U. Martin, "Modeling the mobile radio channel by echo estimation," Frequenz [Frequency], vol. 48, pp. 198–212, 1994 and Martin, Schüβler, and Schwarz, "Ein System zur Messung der Eigenschaften von Mobilfunkkanälen und ein Verfahren zur Nachverarbeitung der Meβdaten" [A system for measuring the characteristics of mobile radio channels, and a method for postprocessing of the measured data], Frequenz [Frequency], vol. 46, pp. 178–188, 1992. Using the representation in (3), $X_{MF}$ can be expressed as $$X_{MF} = AD_s C, \tag{8}$$

where C is a K×N matrix as follows:

$$C = \begin{bmatrix} r_{cc}(-\tau_1) & r_{cc}\left(\frac{T_c}{M_c}-\tau_1\right) & \cdots & r_{cc}\left((N-1)\frac{T_c}{M_c}-\tau_1\right) \\ r_{cc}(-\tau_2) & r_{cc}\left(\frac{T_c}{M_c}-\tau_2\right) & \cdots & r_{cc}\left((N-1)\frac{T_c}{M_c}-\tau_2\right) \\ r_{cc}(-\tau_K) & r_{cc}\left(\frac{T_c}{M_c}-\tau_K\right) & \cdots & r_{cc}\left((N-1)\frac{T_c}{M_c}-\tau_K\right) \end{bmatrix} \quad (9)$$

The autocorrelation function of the spread curve c(t) in equation (1) is defined as $$r_{cc}(\tau)=c(\tau)*c(-\tau), \quad (10)$$

where * denotes a convolution process. The transformation of the space/time channel model to a space/frequency channel model is achieved by right multiplication of $X_{MF}$ by the N×N DFT matrix W, $$X_F = X_{MF} W \quad (11)$$

This is also described later in FIG. 1. If the number of frequency bins is a power of 2, highly computer-efficient FFT algorithms can be used to calculate (11). For the purposes of the invention, a 2D space/frequency smoothing process can be used as a preprocessing step for the 2D unitary ESPRIT method. In this context, reference should be made to the dissertation by M. Haardt.

A time invariance over P data matrices X is assumed for the channel. These can be smoothed and combined in order to obtain a more accurate estimate of the order for the model (estimate of the number of dominant wave fronts K). Weak wave fronts are in this case regarded as noise. Estimates of the order for the model are based either on theoretical information criteria, for example as in M. Haardt, "Efficient One-, Two-, and Multidimensional High-Resolution Array Signal Processing," Diss., Munich Technical University, 1996, ISBN 3-8265-2220-6 (pages 63–66) or in DE 19 511 151 A, or on a threshold-value method, for example U. Martin, "Ausbreitung in Mobilfunkkanälen: Beiträge zum Entwurf von Meßgeräten und zur Echoschätzung" [Propagation in mobile radio channels: Articles relating to the design of test equipment and echo estimation], Dissertation, Erlangen University, Germany, October 1994 (pages 164–180). The 2D invariances of the resultant matrix $X_F$ are estimated by means of the 2D unitary ESPRIT method. The final step of the 2D unitary ESPRIT method leads to Eigen values $\lambda_k$ in the form $$\lambda_k = \tan\left(\frac{\zeta_k}{2}\right) + j\tan\left(\frac{\mu_k}{2}\right), \quad (12)$$

where $$\zeta_k = 2\pi\frac{T_k}{T} \text{ and } \mu_k = 2\pi\frac{\Delta}{\lambda}\sin(\phi_k) \quad (13)$$

represent the time and spatial frequencies, respectively. The scalar $T=T_c N_c$ denotes the maximum propagation delay.

In order to improve the channel investigation method, as it is described in the last-mentioned reference, and which is based on a 2D unitary ESPRIT method which involves considerably less computation complexity than the SAGE method, which has likewise already been mentioned, the invention takes account of the chip signal form, in contrast to both the methods referred to. Even in the case of a rectangular chip signal form, as is the situation with SAGE, this modification significantly improves the operation, provided more than one sample is taken per chip. In this context, it should be noted that, if one sample is taken per chip ($M_c=1$), correlation with the PN sequence in the time domain leads to a peak. However, if ($M_c=2$), correlation produces three peaks, which are interpreted as three wave fronts with identical incidence directions but with different amplitudes and delay times. In order to avoid this ambiguity, and thus inaccurate estimates, the chip signal form must generally be included in the analysis.

Improved estimation accuracy is achieved by using mutually overlapping subgroups for the space/frequency smoothing. This was not done in the previously known 2D unitary ESPRIT method. The size of the subgroups obtained by space/frequency smoothing is governed by the number of frequency bins used and by the number of sensors used.

In the above mentioned method by U. Martin, "A Directional Radio Channel Model For Densely Built-Up Urban Areas," in Proc. 2nd European Personal Mobile Communications Conference, Bonn, (pages 237–244), September 1997, it was assumed that the space/frequency correlation matrix of the additive noise (including interference) $R_{nn}$ is equal to the scaled identity matrix, that is to say $$R_{nn} = \sigma_n^2 I. \quad (14)$$

However, equation (14) is not generally valid. According to the invention, however, colored noise can also be dealt with in the space/frequency domain. The space/frequency correlation matrix for the additional noise is, for example, estimated while the user is inactive, as will be explained further below. The high-resolution direction-finding unitary ESPRIT algorithm is appropriately modified for the invention.

According to the reference U. Martin, "A Directional Radio Channel Model for Densely Built-up Urban Areas," the amplitudes are estimated in the space/frequency domain. The invention allows estimation in the space/frequency domain just as well as in the space/time domain. An estimate in the space/time domain considerably improves the estimation accuracy.

Compared with the prior art methods, the invention provides considerably higher accuracy and considerably reduces the computation complexity. Since it is assumed that the channel does not vary with time for the measurements of its characteristics, it is advantageous if the measurement time can be limited. This is achieved by reducing the number of measurement times without this resulting in any reduction in the performance, compared with known methods. Furthermore, the number of available measurement times can be increased by oversampling, in order to achieve better accuracy. It should be noted that, in general, oversampling in the case of the method from the abovementioned reference by U. Martin leads to a model error, which can be avoided by taking account of the chip signal form.

The mathematical apparatus used to carry out the invention will now be explained in more detail first of all, followed by an example of the process of the method according to the invention.

A measurement station having a uniform linear antenna array ULA which comprises M identical sensors (S1 . . . SM) is installed and a mobile radio unit is started up which transmits a test signal, namely a test sequence comprising pulses which are modulated with a rectangular chip signal form by means of a PN sequence. The way in which the matrix $X_F$ is obtained has already been described above, and this is explained in the single figure of the drawing.

$$r_{cc}[n] = r_{cc}\left(n\frac{T_c}{M_c}\right)$$

is obtained by sampling. The vector which contains N sampled correlation values of the correlation function is transformed to the frequency domain using:

$$r_{DFT} = W \begin{bmatrix} r_{cc}[0] \\ r_{cc}[1] \\ \vdots \\ r_{cc}[N-1] \end{bmatrix}, \quad (15)$$

where W is the N×N DFT (=discrete Fourier transformation) matrix. The chip signal form is taken into account as follows, by modification of the space/frequency domain data matrix $X_F$ in (11):

$$X_{F'} = X_F (\mathrm{diag}(r_{DFT}))^{-1} \quad (16)$$

The coefficients in $r_{DFT}$ may be close to zero or equal to zero. Owing to the numerical instability, the N frequency bins of $X_F$, which are multiplied by the reciprocal values of these very small coefficients, do not form part of the submatrices extracted from $X_{F'}$ for smoothing. The smoothing procedure will be explained in the next section.

The 2D invariance matx $X_{F'}$ may be interpreted as a single measurement instant in a (virtual) uniform rectangular array URA of size M×N. It is advantageous space/frequency smoothing using overlapping subgroups.

As an example, let us assume a virtual uniform rectangular array of size M×N=4×5. Such an example is also assumed in "Efficient One-, Two-, and Multi-dimensional High-Resolution Array Signal Processing," Dissertation, Munich Technical University, 1996, ISBN 3-8265-2220-6. There are N=5 frequency bins, which each contain M=4 sensors, and each of the $L_M$=2 linear subgroups has $M_{x,sub}$=M−$L_M$+1=3 sensors in the spatial direction. The selection matrix corresponding to the $1_M^{th}$ subgroup of the uniform rectangular array is defined as:

$$J_{1_M}^{(M)} = [0_{M_{x,sub}\times(1_M-1)}\ I_{M_{x,sub}}\ 0_{M_{x,sub}\times(L_M-1_M)}], 1 \leq L_M \leq L_M. \quad (17)$$

A similar technique can be used in a corresponding manner for the frequency bins. In this case, the N frequency bins are subdivided into $L_N$ subgroups, each of which contains $N_{sub}$=N−$L_N$+1 bins. The suitable selection matrices are given by:

$$J_{L_N}^{(N)} = [0_{N_{sub}\times(1_N-1)}\ I_{N_{sub}}\ 0_{N_{sub}\times(L_N-1_N)}], 1 \leq 1_N \leq L_N. \quad (18)$$

It should be noted that the virtual group of M×N elements was subdivided into $L=L_M L_N$ virtual subgroups, each of which contains $M_{sub}=M_{x,sub}N_{sub}$ elements. Application of the vec{·} operator to the resultant L subgroups in the form $$J_{L_M}^{(M)} X_{F'} J_{L_N}^{(N)T} \in C^{M_{x,sub}\times N_{sub}},$$

gives the matrix $X_{F'}$ of size $M_{sub}$×L. In this case, vec{A} denotes a vector function which maps an m×n matrix A into an mn-dimensional column vector by writing the columns of the matrix one below the other.

It is assumed that the channel does not vary with time over P smoothed data matrices $X_{F'}$. These can be combined using $$X_{sub} = [X_{F'}(1)\ X_{F'}(2) \ldots X_{F'}(i) \ldots X_{F'}(P)] \in C^{M_{sub}\times LP}$$

in order to obtain a more accurate estimate of the order of the model, that is to say the estimate of the number of dominant wave fronts K. In this case, weak wave fronts are regarded as noise. The modified MDL criterion (MDL=Maximum Description Length) is expediently used, which takes account of forward-reverse averaging and smoothing. In this context, reference is made to the abovementioned dissertation by M. Haardt. Where oversampling is used, the statistical assumptions which are required for the MDL criterion are no longer valid. These statistical assumptions can be found in U. Martin, "Ausbreitung in Mobilfunkkanälen" [Propagation in mobile radio channels], as already mentioned above. It is thus worthwhile using the MDL criterion separately for each of the $M_c$ samples of a chip for all the chips. The estimates of the $M_c$ order model are averaged in order to achieve the true order model.

If the noise n defined in equation (3) is white and the chip signal form is rectangular, the transformed noise $n_{F'}$ is white only if no oversampling is taking place. The smoothed noise covariance matrix in the space/time domain is defined as $$R_{nn} = E\{n_{Fsub} n_{Fsub}^H\} \in C^{M_{sub}\times M_{sub}} \quad (19)$$

For each positive integer p, $I_p$ denotes the p×p identity matrix and $\Pi_p$ denotes the p×p substitute matrix, which has ones on its reverse diagonal, and zeros elsewhere.

$$\Pi_p = \begin{bmatrix} & & 1 \\ & 1 & \\ & \cdot^{\cdot^{\cdot}} & \\ 1 & & \end{bmatrix} \in R^{p\times p}.$$

Complex conjugation with itself is represented by an overscore $\overline{(.)}$. In the following text, matrices $Q \in C^{p\times q}$ which satisfy the condition:

$$\Pi_p \overline{Q} = Q \Longleftrightarrow \Pi_p Q = \overline{Q}$$

are referred to as left Π-real. The weakly filled, unitary matrices $$Q_{2n} = \frac{1}{\sqrt{2}} \begin{bmatrix} I_n & jI_n \\ \Pi_n & -j\Pi_n \end{bmatrix} \text{ and} \quad (20)$$

$$Q_{2n+1} = \frac{1}{\sqrt{2}} \begin{bmatrix} I_n & 0 & jI_n \\ 0^T & \sqrt{2} & 0^T \\ \Pi_n & 0 & -j\Pi_n \end{bmatrix}$$

are, for example, left Π-real of even or odd order, respectively.

The estimated covariance matrix for the measurements which are subject to noise is denoted $$\hat{R}_{xx} = \frac{1}{LP} X_{sub} X_{sub}^H \quad (21)$$

In this case, it should be noted that a sliding window can also he used to calculate $\hat{R}_{xx}$ instead of the rectangular window used in this equation. Furthermore, $\hat{R}_{nn}$ denotes an estimate of the covariance matrix for the additive noise (19), which is obtained in a similar way but without the presence of any source signal. These matrices are then transformed in the following way:

$$G_{xx} = Re\{Q_{M_{sub}}^H \hat{R}_{xx} Q_{M_{sub}}\} \text{ and } G_{nn} = Re\{Q_{M_{sub}}^H \hat{R}_{nn} Q_{M_{sub}}\}, \quad (22)$$

where $Q_{M_{sub}}$ denotes any left Π-real matrix of size $M_{sub}\times M_{sub}$, which is likewise unitary.

In order to specify a pair of selection matrices for the 2D unitary ESPRIT method, 1D selection matrices for the uniform linear arrays are first of all defined, as follows, taking account of the spatial invariance.

$$J_1^{(M_x,sub)}=[I_{M_{x,sub}}\ 0_{(M_{x,sub}-1)\times 1}] \text{ and } J_2^{M_{x,sub}}=[0_{(M_{x,sub}-1)\times 1}\ I_{M_{x,sub}-1}]$$

In a similar way, the 1D selection matrices for the frequency bins, account of taking frequency invariance, are defined as:

$$J_1^{Nsub}=[I_{N_{sub}-1}\ 0_{(N_{sub}-1)\times 1}] \text{ and } J_2^{N(sub)}=[0_{(N_{sub}-1)\times 1}\ I_{N_{sub}-1}].$$

The 2D selection matrices of the uniform, rectangular array URA (corresponding to a maximum overlap) are obtained in the following way as Kronecker products.

$$J_{\mu 1}=I_{N_{sub}} \otimes J_1^{(M_x,sub)}\ J_{\mu 2}=I_{N_{sub}} \otimes J_2^{(M_x,sub)} \quad (23)$$

$$J_{\nu 1}=J_1^{(Nsub)} \otimes I_{M_{x,sub}}\ J_{\nu 2}=J_2^{(Nsub)} \otimes I_{M_{x,sub}}. \quad (24)$$

The pairs of transformed selection matrices are then given by:

$$K_{\mu 1}=2 \cdot Re\{Q_{m_s}^H J_{\mu 2} Q_{M_{sub}}\}\ K_{\mu 2}=2 \cdot Im\{Q_{m_2}^H J_{\mu 2} Q_{M_{sub}}\} \quad (25)$$

$$K_{\nu 1}=2 \cdot Re\{Q_{m_f}^H J_{\nu 2} Q_{M_{sub}}\}\ K_{\nu 1}=2 \cdot Im\{Q_{m_f}^H J_{\nu 2} Q_{M_{sub}}\} \quad (26)$$

For a virtual uniform rectangular array of $M_{sub}=M_{x,sub}N_{sub}$ elements, the condition that $m_{s=(Mx,sub}-1)N_{sub}$ and $m_{f=(Nsub}-1)M_{x,sub}$ must be satisfied in order to obtain the maximum overlap of the subgroups in both directions.

The following text provides a brief summary of the 2D unitary ESPRIT with colored noise and the covariance solution approach.

1. Signal subspace estimation: Calculate the generalized eigen decomposition of the matrix pair $G_{xx}$ and $G_{nn}$, that is to say $$G_{xx}E=G_{nn}E\cdot\Sigma \text{ where } \Sigma=\text{diag}\{\sigma_i\}_{i=1}^{M_{sub}}.$$

In this case, the K dominantly generalized eigen vectors of the matrix pair $G_{xx}$ and $G_{nn}$ are contained in $E_s \in R^{M_{sub}\times K}$.

2. Solution of the invariance equations: Solve $$\frac{K_{\mu 1} G_{nn} E_s Y_\mu}{R^{m_s \times K}} \approx \frac{K_{\mu 2} G_{nn} E_x Y \nu}{R^{m_f \times K}} \text{ and}$$

$$\frac{K_{\nu 1} G_{nn} E_s Y \nu}{R^{m_f \times K}} \approx \frac{K_{\nu 2} G_{nn} E_s}{R^{m_f \times K}}$$

with the aid of LS, TLS, SLS or 2D SLS (LS=Least Square, TLS=Total Least Square, SLS=Structured Least Square).

3. Joint spatial and time frequency estimation:
Calculate the eigen values of the complex K×K matrix $$Y_\mu + jY_\nu = T\Lambda T^{-1} \text{ where } \Lambda=\text{diag}\{\lambda_k\}_{k=1}^K$$

• $\mu_k=2 \arctan(Re\{\lambda_k\}), 1\leq k\leq K$

• $\nu_k=2 \arctan(Im\{\lambda_k\}), 1\leq k\leq K$

The amplitudes in the space/time domain or in the space/frequency domain can be estimated using the estimated angles and delay times $\hat{\phi}_k$ and $\hat{T}_k$ in equation (13).

First of all, in order to estimate the amplitudes in the space/frequency domain: the data vector $X_F$ is obtained by $$x_F=\text{vec}\{X_F\}, \quad (27)$$

where $X_F$ can be interpreted as the result of a single sampling process at the time $t_0$. Using a data model in accordance with:

$$x_F(t_0)=A_\nu s_F(t_0)+n_F(t_0) \quad (28)$$

such as that used in M. Haardt, M. D. Zoltowski, C. P. Mathews, and J. A. Nossek, "2D Unitary ESPRIT for Efficient 2D Parameter Estimation," in Proc. IEEE Int. Conf. Acoust., Speech, Signal Processing, vol. 3, pp. 2096–2099, Detroit, Mich. May 1995, the absolute value of the vector $S_F$ indicates the signal power. The virtual 2D control matrix $\hat{A}_\nu$ is governed by the time frequencies $\tau_k$ and the spatial frequencies $\mu_k$ in equation (13), as is described in the abovementioned reference. It should be noted that $\hat{A}_\nu$ is different to the 1D control matrix A in equation (4) and that, furthermore, the noise $n_F$ is not white if oversampling is carried out using a rectangular chip signal form. The noise covariance matrix $R_{nn,F}$, which can be inverted, is defined as $$R_{nn,F}=E\{n_F\cdot n_F^H\}, \quad (29)$$

where $R_{nn,F}$ is an N×N matrix. In contrast to $R_{nn}$ in equation (19), the matrix $R_{nn,F}$ of size MN×MN does not include any space/frequency smoothing. The realistic linear minimum variance estimate (Gauss-Markow estimate) of the amplitudes can then be carried out using:

$$\hat{s}_F=(\hat{A}_V^H \hat{R}_{nn,F}^{-1}\hat{A}_V)^{-1}\hat{A}_V^H \hat{R}_{nn,F}^{-1}\cdot x_F. \quad (30)$$

Let us now turn to the estimates of the amplitudes in the space/time domain: in most cases, significantly greater accuracy can be achieved if the model equation (3) is solved in the space/time domain, since the deterioration caused by an inaccurate estimate of the parameters $\tau_k$ and $\phi_k$ is not so serious. If the array geometry is known and the array is calibrated, then the 1D control matrix $\hat{A}$, as defined in equation (4), is provided completely by the estimated incidence directions $\phi_k$. The vector $S_{PN}$ of $\tau_k$ is assumed to contain the sampled and time-delayed PN sequences corresponding to the delay $\tau_k$. Equation (3) can then be written as:

$$X = \sum_{k=1}^{K} \rho_k a(\phi_k) S_{PN}(\tau_k)^T. \quad (32)$$

And, using $\text{vec}\{Y_1 Y_2 Y_3\}=(Y_3^T \otimes Y_1)\text{vec}\{Y_2\}$, equation (32) can be developed to give $$\text{vec}\{X\} = \sum_{k=1}^{K} \rho_k [S_{PN}(\tau_k) \otimes a(\phi_i)] \quad (33)$$

The operator $\otimes$ denotes the Kronecker product. If the noise n is not white, the noise covariance matrix must be considered as well. In contrast to equation (7), the noise from the entire sequence must be taken into account when calculating the noise covariance matrix:

$$R_{NN}=E\{\text{vec}\{N\}\text{vec}\{N\}^H\}\in C^{MN\times MN}, \quad (34)$$

where $$N=[n[1]\ n[2]\ \ldots\ n[N]]\in C^{M\times N}.$$

The solution of equation (33) for $\hat{\rho}_T$ leads to the estimated amplitudes $\hat{\rho}_{T,1}\ \hat{\rho}_{T,2},\ \ldots\ \hat{\rho}_{T,K}$, where $$\hat{P}=(B^H \hat{R}_{NN}^{-1} B)^{-1} B^H \hat{R}_{NN}^{-1}\cdot \text{vec}\{X\}, \quad (35)$$

where $$B=[S_{PN}(\tau_1) \circledX a(\phi_1) \ S_{PN}(\tau_2) \circledX a(\phi_2) \ldots S_{PN}(\tau_K) \circledX a(\phi_K)].$$

With regard to the practical technical implementation, it should first of all be reiterated that, depending on the transmission and reception position, the radio channel can be characterized by the number of wave fronts K arriving at the receiver together with their complex amplitudes $\rho_k$, delays $\tau_k$ and arrival angles $\phi_k$ in azimuth. The following three steps are essential for this.

Production and transmission of the transmitted signal s(t) with a test sequence, reception by a one-dimensional antenna array, then transformation to baseband by down-mixing and further sampling. This is followed by digital signal processing with preprocessing by a matched filter, transformation to the space/frequency domain and consideration of the pulse form with appropriate corrections. Finally, the parameters are estimated, namely by joint parameter estimation preferably by means of a 2D unitary ESPRIT method and joint estimation of the complex amplitudes.

These steps will be explained in more detail in the following text:

Production of the Transmission Signal

The transmission signal $$s'(t) = \sum_{i=0}^{P} c(t - iT) \text{ where } c(t) = \sum_{m=0}^{N_c-1} d_m p_c(t - mT_c) \quad (36)$$

comprises P+1 pulse sequences. Each pulse sequence c(t) is modulated by a pseudo-random noise sequence $d_m$ of length $N_c$. The bandwidth of the pulse is governed by the bandwidth of the radio channel to be measured. The amplitudes of the transmission signal $$s'(t)=s(t)+A \text{ are shifted by } A=(1-\sqrt{N_c+1})/N_c \quad (37)$$

in order to correspond to the required model in the space/frequency domain. Furthermore, A is chosen such that the signal-to-noise ratio on reception is optimized, that is to say a matched filter is used. This signal s'(t) is produced in baseband, is mixed to the radio-frequency band to be measured, and is transmitted.

Reception and Evaluation of the Transmission Signal

Preprocessing

Matched Filter

The receiving device comprises a one-dimensional antenna array composed of $M_1$ antennas, with unitary ESPRIT requiring an antenna array which is symmetrical about the center. The received signals are down-mixed to baseband and are sampled at an integer multiple $M_c$ of the fundamental sampling rate $1/T_c$. The sampled signals are correlated with the sequence:

$$c'\left(n \cdot \frac{T_c}{M_c}\right) = c\left(n \cdot \frac{T_c}{M_c}\right) + b\left(n \cdot \frac{T_c}{M_c}\right), \quad (38)$$

Then $$b\left(n \cdot \frac{T_c}{M_c}\right) = \begin{cases} (1+A)/(A \cdot N_c - 1), & 0 \leq n < N_c M_c \\ 0, & \text{otherwise} \end{cases}$$

This results in a matched filter MF, that is to say $$c'\left(n \cdot \frac{T_c}{M_c}\right) = s'\left(-n \cdot \frac{T_c}{M_c}\right)$$

If the chosen pulse form $p_c(t)$ is taken into account in conjunction with (37) and (38), see below, then each wave front results in time-invariance in the space/frequency domain.

Consideration of the Pulse Form

The output from the matched filter $X_{MF}(i) \in C^{M_1 M_2 \times N_c M_c}$ is transformed to the space/frequency domain, $$X_F(i)=X_{MF}(i)W, \quad (39)$$

where $W \in C^{N_c M_c \times M_2}$ is a matrix of the discrete Fourier transformation (DFT). Only those $M_2$ spectral lines are calculated for which the magnitude of the cross-correlation function (transformed to the frequency domain) of the sampled sequences c'(n) and s'(n), |R(1)|, exceeds a limit value T.

The influence of the pulse form and the oversampling are calculated from $X_F$ in the space/frequency domain by substituting $$F = \text{diag}\left\{R\left(N_c M_c - \frac{M_2 - 1}{2}\right), \ldots, R(N_c M_c - 1),\right.$$

$$\left. R(0), R(1), \ldots, R\frac{M_2 - 1}{2}\right\}$$

in $$X_{F'}(i)=X_F(i)F^{-1} \quad (40)$$

The drawing shows only the matrix $X_F$. Consideration of the chip signal form then leads to the matrix $X_{F'}$. Using this approach, the lines of the matrix $X_{F'}(i)$ in the space/frequency domain are invariant in the time direction (irrespective of the pulse form $p_c$ and the oversampling factor $M_c$) for each wave front. The P sequences in the space/frequency domain $$X_{F'}(i)=\text{vec}\{X_{F'}(i)\} 1 \leq i \leq P,$$

are combined, $$X_{F'}=[X_{F'}(1) \ X_{F'}(2) \ldots X_{F'}(P)],$$

and smoothed $$X_{sub}=[J_{1,1}X_{F'} \ J_{1,2}X_{F'} \ldots J_{1,L_2}X_{F'} \ldots J_{L_1 L_2}X_{F'}] \in C^{M_{sub} \times LP} \quad (41)$$

The smoothing results in correlated wave fronts being decorrelated, and the dimension of the signal covariance matrix $$R_{xx}=1/LP \cdot X_{sub} X_{sub}^H \in C^{M_{sub} \times M_{sub}} \quad (42)$$

being reduced, that is to say $M_{sub}<M$. This leads to reduced computation complexity for the breakdown of the eigen values in (43). The noise covariance matrix $R_{nn}$ can be calculated offline. Even if the noise that is present at the antenna array is uncorrelated in the space and time directions, the noise in the frequency domain is often not uncorrelated in time. In this case, $R_{nn}$ is not a scaled diagonal matrix.

Parameter Estimation
2D Unitary ESPRIT Taking Account of Colored Noise

The complex covariance matrices $R_{xx}$ and $R_{nn}$ are transformed into real matrices $G_{xx}$ and $G_{nn}$. A generalized eigen value decomposition $$G_{xx}E = G_{nn}E\cdot\Sigma \text{ with } \Sigma = \text{diag}\{\sigma_i\}_{i=1}^{M_{sub}} \quad (43)$$

gives $E \in C^{M_{sub} \times M_{sub}}$ The columns for $E_s$ comprise dominant, generalized eigen vectors, that is to say those columns for E, which belong to the K' dominant (largest) generalized eigen values $\sigma_k$. These columns for $E_s$ cover the estimated signal subspace, where K' denotes the number of dominant wave fronts. The subspace estimate $E_s$ is used to produce three invariance equations:

$$K_{(r)1}G_{nn}E_sY_r \approx K_{(r)2}G_{nn}E_s \in R^{m \times K'}, r=1,2 \quad (44)$$

which are solved, for example, for $Y_r$ using the least squares method. The spatial and time frequencies sought $$\mu_k^{(1)} = -\frac{2\pi\Delta}{\lambda}\sin\phi_k, \mu_k^{(2)} = -2\pi\frac{\tau_k}{\tau_{max}} \quad (45)$$

can be determined by the complex eigen value decomposition $$Y_1 + jY_2 = T\Lambda T^{-1} \text{ with } \Lambda = \text{diag }\{\lambda_k\}_{k=1}^{K'} \quad (46)$$

wherein

- $\mu_k^1 = 2 \arctan (Re\{\lambda_k\})$, $1 \leq k \leq K'$

- $\mu_k^2 = 2 \arctan (Im\{\lambda_k\})$, $1 \leq k \leq K'$

The frequencies from equation (45) give the sought incidence angles (azimuth $\phi_k$) and delays $\tau_k$ of the K' dominant wave fronts.

Joint Estimation of the Complex Amplitudes

In order to estimate complex amplitudes, the signal matrix $S \in C^{K' \times QN_cM_c}$ is constructed from the delays $\tau_k$, and the control matrix $A_a \in C^{M_1 \times K'}$ is constructed from the spatial frequencies $\mu_k^{(1)}$. The complex amplitudes $$S = (B^H R_{NN}^{-1} B)^{-1} B^H R_{NN}^{-1} \cdot \text{vec}\{X\} \text{ with } B = S^T \diamond A_a \quad (47)$$

are estimated over $Q \leq P$ sequences in the space/time domain. $R_{NN}$ is the estimated noise covariance matrix in the time domain.

In summary, the advantages over the prior art methods may be summarized as follows:

The signal-to-noise ratio is maximized by changing the transmission and correlation sequence, the pulse form is taken into account in the space/frequency domain, any desired pulse form and any desired integer sampling factor are possible, elimination of the weak spectral lines leads to the influence of the noise being reduced and reduces the computation complexity, high-resolution joint estimation of the azimuth and delay is possible by using the 2D unitary ESPRIT method and by transformation to the space/frequency domain over sequences, the 2D unitary ESPRIT method can likewise be expanded to take account of the colored noise in the space/frequency domain, and the amplitudes can be estimated jointly in the space/time domain over Q sequences.

We claim:

1. A method of measuring characteristics of radio channels, which comprises:

transmitting a transmission signal containing a preselected test sequence;

receiving signals with a plurality of receiving sensors in a linear antenna array, wherein respective received signals are composed of wave elements of the transmission signal with a different incidence direction and different delay;

demodulating the received signals and sampling to obtain samples;

supplying the samples for calculation of eigen vectors corresponding to dominant eigenvalues, and deriving a signal subspace matrix from the calculated eigen vectors;

producing invariance equations dependent on the signal subspace matrix; and simultaneously determining estimated values for an incidence direction and delays of dominant wave fronts by solving the invariance equations.

2. The method according to claim 1, wherein the test sequence has a chip signal form, and the chip signal form is taken into account in the step of determining the estimated values.

3. The method according to claim 2, wherein the sampling step comprises taking a total of $M_c$ samples per chip in the test sequence.

4. The method according to claim 1, which comprises transforming the samples to the frequency domain by discrete Fourier transformation.

5. The method according to claim 2, which comprises correcting the samples taking account of a spectrum of the chip signal form of the test sequence, and combining the line vectors formed from the corrected samples for the receiving sensors to form a data matrix $X_F(n)$ contains invariances characterizing the channel.

6. The method according to claim 1, which comprises choosing a modulated pseudo-random noise sequence for the transmission signal.

7. The method according to claim 1, which comprises determining an azimuth incidence direction.

8. The method according to claim 1, which comprises mixing the signals received by the receiving sensors and subsequently demodulating the sensors to baseband.

9. The method according to claim 1, which comprises filtering the samples matched to the signal.

10. The method according to claim 1, wherein the sampling step comprises sampling the received signals at a sampling frequency greater than twice a received signal bandwidth.

11. The method according to claim 1, which comprises transforming the samples to a frequency domain, and rejecting the samples below a predetermined power limit.

12. The method according to claim 3, which comprises, after transforming the samples to frequency domain, correcting the samples by division by a square of a spectrum of the chip signal form of the test sequence.

13. The method according to claim 1, which comprises subjecting the samples to smoothing in the space/frequency domain.

14. The method according to claim 1, which comprises carrying out a determination and an association of superimposed, spatial and time invariances with a two-dimensional, high-resolution frequency estimation algorithm in the space/frequency domain.

15. The method according to claim 14, which comprises taking colored noise in the space/frequency domain into account in the three-dimensional, high-resolution frequency estimation algorithm.

16. The method according to claim 14, which comprises selecting 2D Unitary ESPRIT method as the frequency estimation algorithm.

17. The method according to claim 1, which comprises jointly estimating complex amplitudes in one of a space/frequency domain and a space/time domain.

18. The method according to claim 17, which comprises carrying out the joint estimation using a weighted least squares method.

19. A measurement configuration for measuring characteristics of radio channels, comprising:

a linear antenna array;

a plurality $M_1$ of receiving sensors;

each of said receiving sensors being followed, in a signal flow direction:
  an analog/digital sampling device connected to a respective said sensor;
  a matched filter connected to said sampling device; and
  a device for discrete Fourier transformation connected to said filter;
  and at least one signal processor for processing the method according to claim 1.

* * * * *